United States Patent
Lin et al.

(10) Patent No.: US 11,630,672 B2
(45) Date of Patent: Apr. 18, 2023

(54) REDUCING A NUMBER OF COMMANDS TRANSMITTED TO A CO-PROCESSOR BY MERGING REGISTER-SETTING COMMANDS HAVING ADDRESS CONTINUITY

(71) Applicant: GlenFly Technology Co., Ltd., Shanghai (CN)

(72) Inventors: Jianming Lin, Shanghai (CN); Xuan Zhao, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 59 days.

(21) Appl. No.: 17/028,966

(22) Filed: Sep. 22, 2020

(65) Prior Publication Data

US 2022/0066778 A1 Mar. 3, 2022

(30) Foreign Application Priority Data

Aug. 28, 2020 (CN) .......................... 202010887217.4

(51) Int. Cl.
*G06F 9/38* (2018.01)
*G06F 9/30* (2018.01)

(52) U.S. Cl.
CPC ........ *G06F 9/3853* (2013.01); *G06F 9/30018* (2013.01); *G06F 9/3877* (2013.01); *G06F 9/3881* (2013.01)

(58) Field of Classification Search
CPC .. G06F 9/30018; G06F 9/3017; G06F 9/3853; G06F 9/3877; G06F 9/3881
See application file for complete search history.

(56) References Cited

U.S. PATENT DOCUMENTS

| | | | | |
|---|---|---|---|---|
| 8,520,016 B2 * | 8/2013 | Hsu | ........................ | G06T 15/005 712/241 |
| 8,854,385 B1 * | 10/2014 | Craik | ........................ | G06T 1/20 345/522 |
| 2002/0087955 A1 * | 7/2002 | Ronen | ................... | G06F 9/3001 712/E9.037 |
| 2009/0086265 A1 * | 4/2009 | Toda | ..................... | G06F 3/1284 358/1.15 |
| 2010/0268813 A1 * | 10/2010 | Pahlavan | ................. | G06F 9/452 709/227 |
| 2010/0315431 A1 * | 12/2010 | Smith | ..................... | G06T 11/20 345/619 |

FOREIGN PATENT DOCUMENTS

WO WO-2011134942 A1 * 11/2011 ............. G06F 9/485
WO WO-2013144733 A2 * 10/2013 ........... G06F 9/3017

* cited by examiner

*Primary Examiner* — David J. Huisman
(74) *Attorney, Agent, or Firm* — JCIPRNET

(57) ABSTRACT

An electronic apparatus and a method for reducing the number of commands are provided. The electronic apparatus includes a central processor and a co-processor. The central processor generates a plurality of original register setting commands to set at least one bit of at least one register of the co-processor. The original register setting commands include a plurality of first original register setting commands, and a plurality of setting targets of the first original register setting commands have address continuity. The central processor merges the first original register setting commands to generate at least one merged register setting command. The central processor transmits the at least one merged register setting command to the co-processor.

5 Claims, 1 Drawing Sheet

REDUCING A NUMBER OF COMMANDS TRANSMITTED TO A CO-PROCESSOR BY MERGING REGISTER-SETTING COMMANDS HAVING ADDRESS CONTINUITY

CROSS-REFERENCE TO RELATED APPLICATION

This application claims the priority benefit of China application no. 202010887217.4, filed on Aug. 28, 2020. The entirety of the above-mentioned patent application is hereby incorporated by reference herein and made a part of this specification.

BACKGROUND

Technical Field

The disclosure relates to an electronic apparatus, and in particular, to a method for reducing the number of commands of the electronic apparatus.

Description of Related Art

In an electronic apparatus, the central processor issues a plurality of commands to the co-processor. For instance, the central processing unit (CPU) which executes the operation system (OS) and application programs may send a plurality of commands to the graphic processor (graphic processing unit (GPU)). Generally, these commands sent to the GPU include register setting commands, drawing commands, and other commands.

The co-processor is formed by different hardware modules. Generally, each of the hardware modules includes plural respective hardware registers. Each of the registers is configured to store/record one (or plural) operating parameter(s) required by the co-processor for operation. Through setting (changing) the content of these registers of the co-processor, the central processor may control the operation of the co-processor. For instance, through setting (changing) the content of one (or plural) register(s) of the GPU, the CPU may control drawing operation of the GPU.

The size (the number of bits) of each register of the co-processor may be defined according to design needs. For instance, one register may be 32 bits. The function of the 32 bits may be defined according to design needs. In the 32 bits of one register, one single bit may be used to represent (store) one operating parameter of the co-processor, or a plurality of bits may be used to represent (store) one operating parameter of the co-processors. That is, one register may store a plurality of operating parameters of the co-processor. Further, all of the bits (e.g., 32 bits) of one register may be used to represent (store) one operating parameter of the co-processor.

For the convenience of addressing, register addresses are generally given to these registers of the co-processor. For instance, these registers may be divided into a plurality of register groups according to hardware modules, and one group ID is assigned to each of the register groups. In one register group, each register may be addressed according to an internal offset.

The operation system and/or the application programs generally set (update) these operating parameters of the co-processor according to operating statuses. Generally, the co-processor has a large number of operating parameters. The co-processor may perform one operation according to a plurality of operating parameters. For instance, the CPU may have to set (change) a plurality of operating parameters of the GPU first, and the CPU may then send one drawing command to the GPU to perform one drawing operation. In order to set (update) these operating parameters to these registers of the co-processor, the central processor (that is, the operation system and/or the application programs) needs to send a large number of register setting commands to the co-processor through the bus. When the number of the operating parameters required to be set (updated) increases, the number of the register setting commands generated by the central processor increases as well. The large number of these register setting commands may occupy the bandwidth of the bus. From another perspective, the command processing speed and performance of the co-processor is affected (lowered) because the co-processor has to parse the large number of these register setting commands.

It should be noted that the contents disclosed in the "Description of Related Art" section is used for enhancement of understanding of the disclosure. A part of the contents (or all of the contents) disclosed in the "Description of Related Art" section may not pertain to the conventional technology known to people having ordinary skill in the art. The information disclosed in the "Description of Related Art" section does not mean that the content is known to people having ordinary skill in the art before the filing of the disclosure.

SUMMARY

The disclosure provides an electronic apparatus and a method for reducing the number of commands thereof through which a plurality of original register setting commands are merged to generate at least one merged register setting command, and that the number of the register setting commands is reduced.

In an embodiment of the disclosure, the method for reducing the number of commands is adapted for reducing the number of a plurality of register setting commands. The method for reducing the number of commands includes the following steps. A plurality of original register setting commands are generated by a central processor. Each of the original register setting commands is adapted to set at least one bit of at least one register of a co-processor. The original register setting commands include a plurality of first original register setting commands, and a plurality of setting targets of the first original register setting commands have address continuity. The first original register setting commands are merged to generate at least one merged register setting command by the central processor. The at least one merged register setting command is transmitted to the co-processor by the central processor.

In an embodiment of the disclosure, the electronic apparatus includes a central processor and a co-processor. The co-processor includes at least one register. The central processor is coupled to the co-processor. The central processor is configured to generate a plurality of original register setting commands. Each of the original register setting commands is adapted to set at least one bit of the at least one register of the co-processor. The original register setting commands include a plurality of first original register setting commands, and a plurality of setting targets of the first original register setting commands have address continuity. The central processor merges the first original register setting commands to generate at least one merged register setting command. The central processor transmits the at least one merged register setting command to the co-processor.

Based on the above, in the embodiments of the disclosure, the central processor merges the first original register setting commands with setting targets having address continuity into at least one merged register setting command. Next, the central processor transmits the at least one merged register setting command to the co-processor. Therefore, the number of the register setting commands transmitted from the central processor to the co-processor may be effectively reduced.

To make the aforementioned more comprehensible, several embodiments accompanied with drawings are described in detail as follows.

DESCRIPTION OF THE EMBODIMENTS

Figure 1:
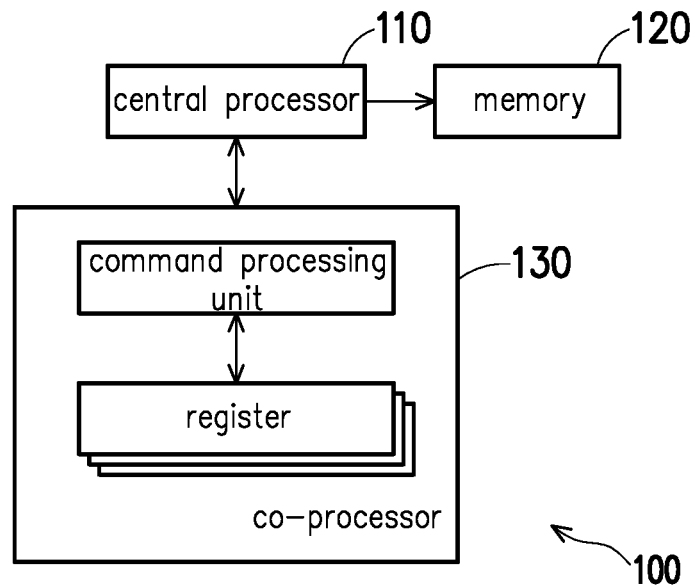
FIG. 1 is a schematic view of circuit blocks of an electronic apparatus according to an embodiment of the disclosure.

The term "coupled to (or connected to)" used in the entire disclosure (including claims) refers to any direct or indirect connecting means. For example, if the disclosure describes a first apparatus is coupled to (or connected to) a second apparatus, the description should be explained as the first apparatus that is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements. Moreover, elements/components/steps with the same reference numerals represent the same or similar parts in the figures and embodiments where appropriate. Descriptions of the elements/components/steps with the same reference numerals or terms in different embodiments may be references for one another.

FIG. 1 is a schematic view of circuit blocks of an electronic apparatus 100 according to an embodiment of the disclosure. The electronic apparatus 100 shown in FIG. 1 includes a central processor 110, memory 120, and a co-processor 130. In the following description, according to different design needs, the central processor 110 and/or the co-processor 130 may be implemented in the form of hardware, firmware, software (i.e., a program), or a combination of the majority of the foregoing three.

The central processor 110 is coupled to the memory 120. According to design needs, the central processor 110 may include a central processing unit (CPU), a controller, a micro-controller, a micro-processor, an application-specific integrated circuit (ASIC), a digital signal processor (DSP), a field programmable gate array (FPGA), or other central processing circuits. The memory 120 may include a read only memory (ROM), random access memory (RAM), a flash memory, and/or a storage device. The storage device includes a hard disk drive (HDD) a solid-state drive (SSD), or other storage devices. In some other embodiments, the recording medium may include a "non-transitory computer readable medium", such as a tape, a disk, a card, semiconductor memory, a programmable logic circuit, etc. The memory 120 is adapted for storing part (or all) of the programming codes of an operation system (OS) and/or an application program. The central processor 110 may read and execute the programming codes from the memory 120, so as to accomplish the related functions of the central processor 110 described in the following embodiments. Further, the programming codes may also be provided to the electronic apparatus 100 (or the central processor 110) through any transmission medium (a communication network or a broadcast wave and the like). The communication network includes, for example, Internet, a wired communication network, a wireless communication network, or other communication media.

According to design needs, the co-processor 130 may include a controller, a micro-controller, a micro-processor, an ASIC, a DSP, a FPGA, or other processing circuits. The co-processor 130 is coupled to the central processor 110 through a bus. The central processor 110 may issue one or a plurality of commands to the co-processor 130. According to the command(s) from the central processor 110, the co-processor 130 may perform a function operation. For instance, in some embodiments, the co-processor 130 may include a graphic processor (a graphic processing unit (GPU)) and/or other co-processing circuits. In some application scenarios, these commands sent from the central processor 110 to the co-processor 130 may include a register setting command, a drawing command, and/or other commands. According to the commands from the central processor 110, the GPU (co-processor 130) may perform a drawing operation.

According to design needs, in the embodiment shown in FIG. 1, the co-processor 130 may include at least one command processing unit and at least one register. According to the content of the (or these) register of the co-processor 130, the command processing unit may execute (or control) the function operation of the co-processor 130. For instance, the register is configured to store at least one drawing parameter. According to the drawing parameter of the (or these) register of the co-processor 130, the command processing unit may execute (or control) the drawing operation of the co-processor 130.

The size (the number of bits) of each register of the co-processor 130 may be defined according to design needs. For instance, the size of one register may be 32 bits. The function of the 32 bits may be defined according to design needs. In the 32 bits of one register, one single bit may be used to represent (store) one operating parameter of the co-processor 130, or a plurality of bits may be used to represent (store) one operating parameter of the co-processors 130. That is, one register may store a plurality of operating parameters of the co-processor 130. Further, all of the bits (e.g., 32 bits) of one register may be used to represent (store) one operating parameter of the co-processor 130.

The central processor 110 may issue the register setting command to the co-processor 130, so as to set (change) part or all of the content (i.e., one or a plurality of operating parameters, such as the drawing parameter) of any register of the co-processor 130. Through setting (changing) the content (operating parameters) of these registers of the co-processor 130, the central processor 110 may control the function operation (e.g., the drawing operation) of the co-processor 130.

Figure 2:
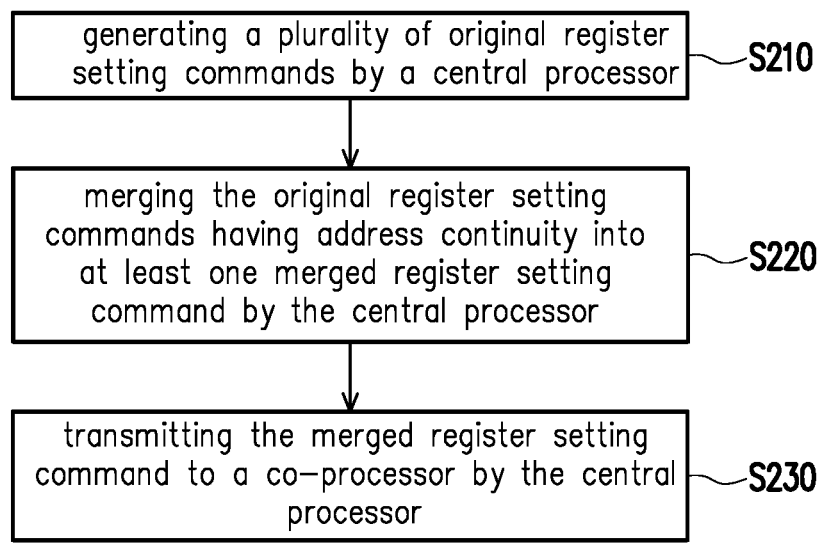
FIG. 2 is a schematic flow chart of a method for reducing the number of commands according to an embodiment of the disclosure.

FIG. 2 is a schematic flow chart of a method for reducing the number of commands according to an embodiment of the disclosure. With reference to FIG. 1 and FIG. 2, in step S210, the central processor 110 may execute the programming codes of an operation system (OS) and/or an application program and/or execute other programming codes. In the process of executing the programming codes, the central processor 110 may generate a plurality of original register setting commands. Each of the original register setting commands is adapted to set least one bit of at least one register of the co-processor 130. These original register setting commands may be temporarily stored in the memory 120 and/or cache memory (not shown) of the central processor 110.

Generally, some register setting commands (herein referred to as first original register setting commands) in the original register setting commands may have address continuity. That is, a plurality of setting targets of these first original register setting commands have address continuity. In step S220, the central processor 110 may merge these first original register setting commands (that is, the original register setting commands having address continuity) to generate at least one merged register setting command. After merging is performed, in step S230, the central processor 110 may transmit the at least one merged register setting command to the co-processor 130. Therefore, the electronic apparatus 100 may execute the method for reducing the number of commands as shown in FIG. 2 to reduce the number of register setting commands transmitted from the central processor 110 to the co-processor 130. Since the number of the register setting commands transmitted from the central processor 110 to the co-processor 130 may be effectively reduced, a bandwidth of a bus between the central processor 110 and the co-processor 130 may be effectively used. From another perspective, since the number of these register setting commands is reduced, the burden of the co-processor 130 to parse these register setting commands may be effectively lowered, and that the command processing speed and performance of the co-processor 130 is enhanced.

Different implementations of step S220 are described through a plurality of examples provided below. Note that according to differences in application environments and conditions, addressing methods of the registers of the co-processor 130 may be different. The format (syntax) of the original register setting commands may also be different. For instance, for the convenience of addressing, these registers of the co-processor 130 may be divided into a plurality of register groups, and one group ID (GID) is assigned to each of the register groups. In one register group, each register may be addressed according to an internal offset.

A first example is illustrated herein. The first example adopts a "sorting and combining method". In the first example, a register setting command with a mask "SetRMask" is used to act as an example of the original register setting commands. It is assumed herein that the syntax of this register setting command with a mask is SetRMask (GID, O, M, V), where GID represents a group ID of a register group, O represents an internal offset of one register group, M represents a mask, and V represents a value. It is also assumed that during execution of a programming code, the central processor 110 may generate a plurality of original commands shown in Table 1. In Table 1, Draw_command represents a drawing command.

TABLE 1

Original Commands and Generation Order Thereof Generated by Central Processor 110

| Order | Original Commands |
|---|---|
| 1 | SetRMask(1, 2, 0x000000FF, 0x00000078) |
| 2 | SetRMask(2, 0, 0xFFF00000, 0x87600000) |
| 3 | SetRMask(1, 2, 0x03000000, 0x02000000) |
| 4 | SetRMask(2, 2, 0xFF000000, 0xAA000000) |
| 5 | SetRMask(1, 5, 0x000000F0, 0x00000070) |
| 6 | SetRMask(2, 1, 0xFFF00000, 0x12300000) |
| 7 | SetRMask(2, 0, 0x00000FF0, 0x00000320) |
| 8 | SetRMask(1, 5, 0x00070000, 0x00040000) |
| 9 | SetRMask(1, 2, 0x0001F800, 0x00005000) |
| 10 | SetRMask(1, 2, 0x00F00000, 0x00300000) |
| 11 | SetRMask(1, 5, 0x0000F000, 0x00005000) |
| 12 | SetRMask(1, 2, 0x00000700, 0x00000600) |
| 13 | SetRMask(1, 5, 0xFF000000, 0x12000000) |
| 14 | SetRMask(3, 2, 0x0000000F, 0x00000001) |
| 15 | SetRMask(2, 2, 0x00FFF000, 0x00BBB000) |
| 16 | SetRMask(2, 0, 0x0000000F, 0x00000001) |
| 17 | SetRMask(1, 2, 0x000E0000, 0x00040000) |
| 18 | SetRMask(2, 0, 0x000FF000, 0x00054000) |
| 19 | SetRMask(1, 2, 0xF0000000, 0x10000000) |
| 20 | SetRMask(3, 2, 0xFF000000, 0x22000000) |
| 21 | SetRMask(2, 2, 0x00000FFF, 0x00000CCC) |
| 22 | SetRMask(1, 5, 0x00000008, 0x00000008) |
| 23 | SetRMask(3, 2, 0x00FFFFF0, 0x00555550) |
| 24 | SetRMask(2, 1, 0x000FFFFF, 0x00045678) |
| 25 | Draw_command |

In the first example, the central processor 110 may sort these original register setting commands according to addresses of the setting targets of the original register setting commands as shown in Table 1. For instance, the central processor 110 may sort the original register setting commands shown in Table 1 in ascending powers (ascending order). The sorted original commands are shown in Table 2.

TABLE 2

New Order of Sorted Original Commands

| Original Order | New Order | Original Commands |
|---|---|---|
| 1 | 1 | SetRMask(1, 2, 0x000000FF, 0x00000078) |
| 12 | 2 | SetRMask(1, 2, 0x00000700, 0x00000600) |
| 9 | 3 | SetRMask(1, 2, 0x0001F800, 0x00005000) |
| 17 | 4 | SetRMask(1, 2, 0x000E0000, 0x00040000) |
| 10 | 5 | SetRMask(1, 2, 0x00F00000, 0x00300000) |
| 3 | 6 | SetRMask(1, 2, 0x03000000, 0x02000000) |
| 19 | 7 | SetRMask(1, 2, 0xF0000000, 0x10000000) |
| 22 | 8 | SetRMask(1, 5, 0x00000008, 0x00000008) |
| 5 | 9 | SetRMask(1, 5, 0x000000F0, 0x00000070) |
| 11 | 10 | SetRMask(1, 5, 0x0000F000, 0x00005000) |
| 8 | 11 | SetRMask(1, 5, 0x00070000, 0x00040000) |
| 13 | 12 | SetRMask(1, 5, 0xFF000000, 0x12000000) |
| 16 | 13 | SetRMask(2, 0, 0x0000000F, 0x00000001) |
| 7 | 14 | SetRMask(2, 0, 0x00000FF0, 0x00000320) |
| 18 | 15 | SetRMask(2, 0, 0x000FF000, 0x00054000) |
| 2 | 16 | SetRMask(2, 0, 0xFFF00000, 0x87600000) |
| 24 | 17 | SetRMask(2, 1, 0x000FFFFF, 0x00045678) |
| 6 | 18 | SetRMask(2, 1, 0xFFF00000, 0x12300000) |
| 21 | 19 | SetRMask(2, 2, 0x00000FFF, 0x00000CCC) |
| 15 | 20 | SetRMask(2, 2, 0x00FFF000, 0x00BBB000) |
| 4 | 21 | SetRMask(2, 2, 0xFF000000, 0xAA000000) |
| 14 | 22 | SetRMask(3, 2, 0x0000000F, 0x00000001) |
| 23 | 23 | SetRMask(3, 2, 0x00FFFFF0, 0x00555550) |
| 20 | 24 | SetRMask(3, 2, 0xFF000000, 0x22000000) |
| 25 | 25 | Draw_command |

After sorting is completed, the central processor 110 may merge the "first original register setting commands" (that is, the original register setting commands having address continuity) with the setting targets having addresses of a same register into a merged register setting command. For instance, in these original register setting commands in the new order of 1 to 7 shown in Table 2, all of the addresses of the setting targets are "in the register group of group ID 1, offset 2". The setting targets of the original register setting commands in the new order of 1 to 7 are the same register, so that the central processor 110 may merge these original register setting commands in the new order of 1 to 7 shown in Table 2 into one merged register setting command "SetR-Mask(1, 2, 0xF3FFFFFF, 0x12345678)". Merging of the rest of the original register setting commands shown in Table 2 may be deduced by analogy.

The merged commands are shown in Table 3. From Table 3, it can be seen that the number of the register setting commands transmitted from the central processor 110 to the co-processor 130 may be effectively reduced. Therefore, the bandwidth of the bus between the central processor 110 and the co-processor 130 may be effectively used. From another perspective, since the number of these register setting commands is reduced, the burden of the co-processor 130 to parse these register setting commands may be effectively lowered, and that the command processing speed and performance of the co-processor 130 is enhanced.

TABLE 3

Original Commands and Merged Register Setting Commands

| Original Commands | Merged Commands |
|---|---|
| SetRMask(1, 2, 0x000000FF, 0x00000078) | SetRMask(1, 2, |
| SetRMask(1, 2, 0x00000700, 0x00000600) | 0xF3FFFFFF, |
| SetRMask(1, 2, 0x0001F800, 0x00005000) | 0x12345678) |
| SetRMask(1, 2, 0x000E0000, 0x00040000) | |
| SetRMask(1, 2, 0x00F00000, 0x00300000) | |
| SetRMask(1, 2, 0x03000000, 0x02000000) | |
| SetRMask(1, 2, 0xF0000000, 0x10000000) | |
| SetRMask(1, 5, 0x00000008, 0x00000008) | SetRMask(1, 5, |
| SetRMask(1, 5, 0x000000F0, 0x00000070) | 0xFF07F0F8, |
| SetRMask(1, 5, 0x0000F000, 0x00005000) | 0x12045078) |
| SetRMask(1, 5, 0x00070000, 0x00040000) | |
| SetRMask(1, 5, 0xFF000000, 0x12000000) | |
| SetRMask(2, 0, 0x0000000F, 0x00000001) | SetRMask(2, 0, |
| SetRMask(2, 0, 0x000000FF0, 0x00000320) | 0xFFFFFFFF, |
| SetRMask(2, 0, 0x000FF000, 0x00054000) | 0x87654321) |
| SetRMask(2, 0, 0xFFF00000, 0x87600000) | |
| SetRMask(2, 1, 0x000FFFFF, 0x00045678) | SetRMask(2, 1, |
| SetRMask(2, 1, 0xFFF00000, 0x12300000) | 0xFFFFFFFF, |
| | 0x12345678) |
| SetRMask(2, 2, 0x00000FFF, 0x00000CCC) | SetRMask(2, 2, |
| SetRMask(2, 2, 0x00FFF000, 0x00BBB000) | 0xFFFFFFFF, |
| SetRMask(2, 2, 0xFF000000, 0xAA000000) | 0xAABBBCCC) |
| SetRMask(3, 2, 0x0000000F, 0x00000001) | SetRMask(3, 2, |
| SetRMask(3, 2, 0x00FFFFF0, 0x00555550) | 0xFFFFFFFF, |
| SetRMask(3, 2, 0xFF000000, 0x22000000) | 0x22555551) |
| Draw_command | Draw_command |

A second example is illustrated next. The second example also adopts the "sorting and combining method". In the second example, a register setting command without a mask "SetR" is used to act as an example of the original register setting commands. This register setting command "SetR" may continuously set one or a plurality of registers. It is assumed herein that the syntax of this register setting command is SetR(GID, O, N, V1, . . . , VN), where GID represents a group ID of a register group, O represents an internal offset of one register group, N represents the number of registers, and V1, . . . , VN represent values of these N registers. It is also assumed that during execution of a programming code, the central processor 110 may generate a plurality of original commands shown in Table 4. In Table 4, Draw_command represents a drawing command.

TABLE 4

Original Commands and Generation Order Thereof Generated by Central Processor 110

| Order | Original Commands |
|---|---|
| 1 | SetR(2, 3, 2, 0x22221111, 0x22222222) |
| 2 | SetR(3, 3, 2, 0x33333333, 0x33334444) |
| 3 | SetR(3, 1, 1, 0x33331111) |
| 4 | SetR(3, 5, 1, 0x33335555) |
| 5 | Draw_command |

In the second example, the central processor 110 may sort these original register setting commands according to addresses of the setting targets of the original register setting commands as shown in Table 4. For instance, the central processor 110 may sort the original register setting commands shown in Table 4 in ascending powers (ascending order). The sorted original commands are shown in Table 5.

TABLE 5

New Order of Sorted Original Commands

| Original Order | New Order | Original Commands |
|---|---|---|
| 1 | 1 | SetR(2, 3, 2, 0x22221111, 0x22222222) |
| 3 | 2 | SetR(3, 1, 1, 0x33331111) |
| 2 | 3 | SetR(3, 3, 2, 0x33333333, 0x33334444) |
| 4 | 4 | SetR(3, 5, 1, 0x33335555) |
| 5 | 5 | Draw_command |

After sorting is completed, the central processor 110 may merge the "first original register setting commands" (that is, the original register setting commands having address continuity) with the setting targets having continuous addresses of a plurality of registers into a merged register setting command. For instance, in these original register setting commands in the new order of 3 to 4 shown in Table 5, the continuous addresses of the setting targets are three registers (that is, the three registers "in the register group of group ID 3, offsets 3, 4, and 5"). The setting targets of the original register setting commands in the new order of 3 to 4 shown in Table 5 are three registers of continuous addresses, so that the central processor 110 may merge these original register setting commands in the new order of 3 to 4 shown in Table 5 into one merged register setting command "SetR(3, 3, 3, 0x33333333, 0x33334444, 0x33335555)".

The merged commands are shown in Table 6. From Table 6, it can be seen that the number of the register setting commands transmitted from the central processor 110 to the co-processor 130 may be effectively reduced. Therefore, the bandwidth of the bus between the central processor 110 and the co-processor 130 may be effectively used. From another perspective, since the number of these register setting commands is reduced, the burden of the co-processor 130 to parse these register setting commands may be effectively lowered, and that the command processing speed and performance of the co-processor 130 is enhanced.

TABLE 6

Original Commands and Merged Register Setting Commands

| Original Commands | Original Commands |
|---|---|
| SetR(2, 3, 2, 0x22221111, 0x22222222) | SetR(2, 3, 2, 0x22221111, 0x22222222) |
| SetR(3, 1, 1, 0x33331111) | SetR(3, 1, 1, 0x33331111) |

TABLE 6-continued

Original Commands and Merged Register Setting Commands

| Original Commands | Original Commands |
|---|---|
| SetR(3, 3, 2, 0x33333333, 0x33334444) | SetR(3, 3, 3, 0x33333333, 0x33334444, 0x33335555) |
| SetR(3, 5, 1, 0x33335555) | |
| Draw_command | Draw_command |

A third example is illustrated as follows. The third example also adopts the "sorting and combining method". In the third example, the register setting command with a mask "SetRMask" and the register setting command without a mask "SetR" are used to act as examples of the original register setting commands. It is assumed that during execution of a programming code, the central processor 110 may generate a plurality of original commands shown in Table 7. In Table 7, Draw_command represents a drawing command.

TABLE 7

Original Commands and Generation Order Thereof Generated by Central Processor 110

| Order | Original Commands |
|---|---|
| 1 | SetRMask(1, 2, 0x000000FF, 0x00000078) |
| 2 | SetRMask(2, 0, 0xFFF00000, 0x87600000) |
| 3 | SetRMask(1, 2, 0x03000000, 0x02000000) |
| 4 | SetRMask(2, 2, 0xFF000000, 0xAA000000) |
| 5 | SetRMask(1, 5, 0x000000F0, 0x00000070) |
| 6 | SetRMask(2, 1, 0xFFF00000, 0x12300000) |
| 7 | SetRMask(2, 0, 0x000000FF0, 0x00000320) |
| 8 | SetRMask(1, 5, 0x00070000, 0x00040000) |
| 9 | SetRMask(1, 2, 0x0001F800, 0x00005000) |
| 10 | SetR(2, 3, 2, 0x22221111, 0x22222222) |
| 11 | SetRMask(1, 2, 0x00F00000, 0x00300000) |
| 12 | SetRMask(1, 5, 0x0000F000, 0x00005000) |
| 13 | SetRMask(1, 2, 0x00000700, 0x00000600) |
| 14 | SetRMask(1, 5, 0xFF000000, 0x12000000) |
| 15 | SetRMask(3, 2, 0x0000000F, 0x00000001) |
| 16 | SetR(3, 3, 2, 0x33333333, 0x33334444) |
| 17 | SetR(3, 1, 1, 0x33331111) |
| 18 | SetRMask(2, 2, 0x00FFF000, 0x00BBB000) |
| 19 | SetR(3, 5, 1, 0x33335555) |
| 20 | SetRMask(2, 0, 0x0000000F, 0x00000001) |
| 21 | SetRMask(1, 2, 0x000E0000, 0x00040000) |
| 22 | SetRMask(2, 0, 0x000FF000, 0x00054000) |
| 23 | SetRMask(1, 2, 0xF0000000, 0x10000000) |
| 24 | SetRMask(3, 2, 0xFF000000, 0x22000000) |
| 25 | SetRMask(2, 2, 0x00000FFF, 0x00000CCC) |
| 26 | SetRMask(1, 5, 0x00000008, 0x00000008) |
| 27 | SetRMask(3, 2, 0x00FFFFF0, 0x00555550) |
| 28 | SetRMask(2, 1, 0x000FFFFF, 0x00045678) |
| 29 | Draw_command |

In the third example, the central processor 110 may sort these original register setting commands according to addresses of the setting targets of the original register setting commands as shown in Table 7. For instance, the central processor 110 may sort the original register setting commands shown in Table 7 in ascending powers (ascending order). The sorted original commands are shown in Table 8.

TABLE 8

New Order of Sorted Original Commands

| Original Order | New Order | Original Commands |
|---|---|---|
| 1 | 1 | SetRMask(1, 2, 0x000000FF, 0x00000078) |
| 13 | 2 | SetRMask(1, 2, 0x00000700, 0x00000600) |
| 9 | 3 | SetRMask(1, 2, 0x0001F800, 0x00005000) |
| 21 | 4 | SetRMask(1, 2, 0x000E0000, 0x00040000) |
| 11 | 5 | SetRMask(1, 2, 0x00F00000, 0x00300000) |
| 3 | 6 | SetRMask(1, 2, 0x03000000, 0x02000000) |
| 23 | 7 | SetRMask(1, 2, 0xF0000000, 0x10000000) |
| 26 | 8 | SetRMask(1, 5, 0x00000008, 0x00000008) |
| 5 | 9 | SetRMask(1, 5, 0x000000F0, 0x00000070) |
| 12 | 10 | SetRMask(1, 5, 0x0000F000, 0x00005000) |
| 8 | 11 | SetRMask(1, 5, 0x00070000, 0x00040000) |
| 14 | 12 | SetRMask(1, 5, 0xFF000000, 0x12000000) |
| 20 | 13 | SetRMask(2, 0, 0x0000000F, 0x00000001) |
| 7 | 14 | SetRMask(2, 0, 0x000000FF0, 0x00000320) |
| 22 | 15 | SetRMask(2, 0, 0x000FF000, 0x00054000) |
| 2 | 16 | SetRMask(2, 0, 0xFFF00000, 0x87600000) |
| 28 | 17 | SetRMask(2, 1, 0x000FFFFF, 0x00045678) |
| 6 | 18 | SetRMask(2, 1, 0xFFF00000, 0x12300000) |
| 25 | 19 | SetRMask(2, 2, 0x00000FFF, 0x00000CCC) |
| 18 | 20 | SetRMask(2, 2, 0x00FFF000, 0x00BBB000) |
| 4 | 21 | SetRMask(2, 2, 0xFF000000, 0xAA000000) |
| 10 | 22 | SetR(2, 3, 2, 0x22221111, 0x22222222) |
| 17 | 23 | SetR(3, 1, 1, 0x33331111) |
| 15 | 24 | SetRMask(3, 2, 0x0000000F, 0x00000001) |
| 27 | 25 | SetRMask(3, 2, 0x00FFFFF0, 0x00555550) |
| 24 | 26 | SetRMask(3, 2, 0xFF000000, 0x22000000) |
| 16 | 27 | SetR(3, 3, 2, 0x33333333, 0x33334444) |
| 19 | 28 | SetR(3, 5, 1, 0x33335555) |
| 29 | 29 | Draw_command |

The central processor 110 may perform a "first combination operation" to organize these original register setting commands shown in Table 8 into a middle command group (as shown in Table 9 below) after sorting is completed. Herein, the "first combination operation" includes the following. The central processor 110 may combine a plurality of setting commands with the setting targets having addresses of a same register in these original register setting commands into a combined register setting command. The "first combination operation" may be deduced with reference to related description of Table 2 and Table 3, and description thereof is thus not repeated. The merged commands generated through the "first combination operation" are shown in Table 9. From Table 9, it can be seen that the number of the register setting commands may be effectively reduced.

TABLE 9

Original Commands and Combined Register Setting Commands

| Original Commands | Combined Commands |
|---|---|
| SetRMask(1, 2, 0x000000FF, 0x00000078) | SetRMask(1, 2, |
| SetRMask(1, 2, 0x00000700, 0x00000600) | 0xF3FFFFFF, |
| SetRMask(1, 2, 0x0001F800, 0x00005000) | 0x12345678) |
| SetRMask(1, 2, 0x000E0000, 0x00040000) | |
| SetRMask(1, 2, 0x00F00000, 0x00300000) | |
| SetRMask(1, 2, 0x03000000, 0x02000000) | |
| SetRMask(1, 2, 0xF0000000, 0x10000000) | |
| SetRMask(1, 5, 0x00000008, 0x00000008) | SetRMask(1, 5, |
| SetRMask(1, 5, 0x000000F0, 0x00000070) | 0xFF07F0F8, |
| SetRMask(1, 5, 0x0000F000, 0x00005000) | 0x12045078) |
| SetRMask(1, 5, 0x00070000, 0x00040000) | |
| SetRMask(1, 5, 0xFF000000, 0x12000000) | |
| SetRMask(2, 0, 0x0000000F, 0x00000001) | SetRMask(2, 0, |
| SetRMask(2, 0, 0x000000FF0, 0x00000320) | 0xFFFFFFFF, |
| SetRMask(2, 0, 0x000FF000, 0x00054000) | 0x87654321) |
| SetRMask(2, 0, 0xFFF00000, 0x87600000) | |
| SetRMask(2, 1, 0x000FFFFF, 0x00045678) | SetRMask(2, 1, |
| SetRMask(2, 1, 0xFFF00000, 0x12300000) | 0xFFFFFFFF, |

TABLE 9-continued

Original Commands and Combined Register Setting Commands

| Original Commands | Combined Commands |
|---|---|
| | 0x12345678) |
| SetRMask(2, 2, 0x00000FFF, 0x00000CCC) | SetRMask(2, 2, |
| SetRMask(2, 2, 0x00FFF000, 0x00BBB000) | 0xFFFFFFFF, |
| SetRMask(2, 2, 0xFF000000, 0xAA000000) | 0xAABBBCCC) |
| SetR(2, 3, 2, 0x22221111, 0x22222222) | SetR(2, 3, 2, 0x22221111, |
| | 0x22222222) |
| SetR(3, 1, 1, 0x33331111) | SetR(3, 1, 1, 0x33331111) |
| SetRMask(3, 2, 0x0000000F, 0x00000001) | SetRMask(3, 2, |
| SetRMask(3, 2, 0x00FFFFF0, 0x00555550) | 0xFFFFFFFF, |
| SetRMask(3, 2, 0xFF000000, 0x22000000) | 0x22555551) |
| SetR(3, 3, 2, 0x33333333, 0x33334444) | SetR(3, 3, 2, 0x33333333, |
| | 0x33334444) |
| SetR(3, 5, 1, 0x33335555) | SetR(3, 5, 1, 0x33335555) |
| Draw_command | Draw_command |

The central processor 110 may perform a "second combination operation" to organize the middle command groups shown in Table 9 into merged command groups (as shown in Table 10 below) after the "first combination operation" is completed. Herein, the "second combination operation" includes the following. The central processor 110 may combine a plurality of register setting commands (if the command is the register setting command with a mask of "SetRMask", the mask is required to be "0xFFFFFFFF") with the setting targets having continuous addresses of a plurality of registers in the middle command groups shown in Table 9 into one merged register setting command. The "second combination operation" may be deduced with reference to related description of Table 5 and Table 6, and description thereof is thus not repeated.

TABLE 10

Original Commands and Merged Register Setting Commands

| Original Order | Combined Commands | Merged Commands |
|---|---|---|
| 1 | SetRMask(1, 2, | SetRMask(1, 2, |
| 13 | 0xF3FFFFFF, | 0xF3FFFFFF, |
| 9 | 0x12345678) | 0x12345678) |
| 21 | | |
| 11 | | |
| 3 | | |
| 23 | | |
| 26 | SetRMask(1, 5, | SetRMask(1, 5, |
| 5 | 0xFF07F0F8, | 0xFF07F0F8, |
| 12 | 0x12045078) | 0x12045078) |
| 8 | | |
| 14 | | |
| 20 | SetRMask(2, 0, | SetR(2, 0, 5, 0x87654321, |
| 7 | 0xFFFFFFFF, | 0x12345678, |
| 22 | 0x87654321) | 0xAABBBCCC, |
| 2 | | 0x22221111, |
| 28 | SetRMask(2, 1, 0xFFFFFFFF, | 0x22222222) |
| 6 | 0x12345678) | |
| 25 | SetRMask(2, 2, 0xFFFFFFFF, | |
| 18 | 0xAABBBCCC) | |
| 4 | | |
| 10 | SetR(2, 3, 2, 0x22221111, | |
| | 0x22222222) | |
| 17 | SetR(3, 1, 1, 0x33331111) | SetR(3, 1, 5, 0x33331111, |
| 15 | SetRMask(3, 2, | 0x22555551, |
| 27 | 0xFFFFFFFF, | 0x33333333, |
| 24 | 0x22555551) | 0x33334444, |
| 16 | SetR(3, 3, 2, 0x33333333, | 0x33335555) |
| | 0x33334444) | |
| 19 | SetR(3, 5, 1, 0x33335555) | |
| 29 | Draw command | Draw command |

The combined commands generated through the "second combination operation" are shown in Table 10. From Table 10, it can be seen that the number of the register setting commands transmitted from the central processor 110 to the co-processor 130 may be effectively reduced (from 29 commands to 5 commands). Therefore, the bandwidth of the bus between the central processor 110 and the co-processor 130 may be effectively used. From another perspective, since the number of these register setting commands is reduced, the burden of the co-processor 130 to parse these register setting commands may be effectively lowered, and that the command processing speed and performance of the co-processor 130 is enhanced.

A fourth example is illustrated as follows. The fourth example adopts a "register buffer region method". The central processor 110 may initialize at least one buffer region. The at least one buffer region corresponds to the registers of the co-processor 130 in a one-to-one manner. For instance, if the co-processor 130 has 10 registers, the central processor 110 may initialize 10 buffer regions. These buffer regions may be set in the memory 120 and/or the cache memory (not shown) of the central processor 110.

In the fourth example, the register setting command with a mask "SetRMask" and the register setting command without a mask "SetR" are used to act as examples of the original register setting commands. It is assumed that during execution of a programming code, the central processor 110 may generate a plurality of original commands shown in Table 7. For convenience of illustration, it is assumed herein that these registers of the co-processor 130 may be divided into three register groups (the group IDs respectively are 1, 2, and 3), and each register group has 7 registers. Therefore, the central processor 110 may initialize 3*7=21 buffer regions, as shown in Table 11. Each buffer region has a mask field and a value field.

TABLE 11

Initialized Buffer Regions of Central Processor 110

| Group ID | Offset | Mask | Value |
|---|---|---|---|
| 1 | 0 | 0x00000000 | 0x00000000 |
| | 1 | 0x00000000 | 0x00000000 |
| | 2 | 0x00000000 | 0x00000000 |
| | 3 | 0x00000000 | 0x00000000 |
| | 4 | 0x00000000 | 0x00000000 |
| | 5 | 0x00000000 | 0x00000000 |
| | 6 | 0x00000000 | 0x00000000 |
| 2 | 0 | 0x00000000 | 0x00000000 |
| | 1 | 0x00000000 | 0x00000000 |
| | 2 | 0x00000000 | 0x00000000 |
| | 3 | 0x00000000 | 0x00000000 |
| | 4 | 0x00000000 | 0x00000000 |
| | 5 | 0x00000000 | 0x00000000 |
| | 6 | 0x00000000 | 0x00000000 |
| 3 | 0 | 0x00000000 | 0x00000000 |
| | 1 | 0x00000000 | 0x00000000 |
| | 2 | 0x00000000 | 0x00000000 |
| | 3 | 0x00000000 | 0x00000000 |
| | 4 | 0x00000000 | 0x00000000 |
| | 5 | 0x00000000 | 0x00000000 |
| | 6 | 0x00000000 | 0x00000000 |

The central processor 110 may perform pseudo execution on these original register setting commands shown in Table 7 to correspondingly fill in these buffer regions shown in Table 11 with a plurality of setting values of these original register setting commands. For instance, the central processor 110 may perform pseudo execution on the original register setting command SetRMask(1, 2, 0x000000FF, 0x00000078) of the order of "1" shown in Table 7 to respectively combine "0x000000FF" and "0x00000078"

into the mask field and the value field of the buffer region with the group ID of 1 and offset 2. Next, the central processor 110 may perform pseudo execution on the original register setting command SetRMask(2, 0, 0xFFF00000, 0x87600000) of the order of "2" shown in Table 7 to respectively combine "0xFFF00000" and "0x87600000" into the mask field and the value field of the buffer region with the group ID of 2 and offset 0. By analogy, the central processor 110 may perform pseudo execution on the original register setting commands of the order of "3", "4", and "5" shown in Table 7 to respectively combine the masks and values of these original register setting commands into the mask fields and the value fields of these buffer regions as shown in Table 11. After pseudo execution is performed by the central processor 110 based on the order of "1" to "5" as shown in Table 7, content of the 21 buffer regions of the central processor 110 is shown in Table 12.

TABLE 12

Buffer Regions After Pseudo Execution Performed by Central Processor 110 based on Order of "1" to "5" Shown in Table 7

| Group ID | Offset | Mask | Value |
|---|---|---|---|
| 1 | 0 | | |
|   | 1 | | |
|   | 2 | 0x030000FF | 0x02000078 |
|   | 3 | | |
|   | 4 | | |
|   | 5 | 0x000000F0 | 0x00000070 |
|   | 6 | | |
| 2 | 0 | 0xFFF00000 | 0x87600000 |
|   | 1 | | |
|   | 2 | 0xFF000000 | 0xAA000000 |
|   | 3 | | |
|   | 4 | | |
|   | 5 | | |
|   | 6 | | |
| 3 | 0 | | |
|   | 1 | | |
|   | 2 | | |
|   | 3 | | |
|   | 4 | | |
|   | 5 | | |
|   | 6 | | |

By analogy, the central processor 110 may perform pseudo execution on the original register setting commands of the order of "1" to "28" shown in Table 7 to respectively combine the masks and values of these original register setting commands into the mask fields and the value fields of these buffer regions as shown in Table 11. After pseudo execution is performed by the central processor 110 based on the order of "1" to "28" as shown in Table 7, content of the 21 buffer regions of the central processor 110 is shown in Table 13.

TABLE 13

Buffer Regions After Pseudo Execution Performed by Central Processor 110 based on Order of "1" to "28" Shown in Table 7

| Group ID | Offset | Mask | Vale |
|---|---|---|---|
| 1 | 0 | | |
|   | 1 | | |
|   | 2 | 0xF3FFFFFF | 0x12345678 |
|   | 3 | | |
|   | 4 | | |
|   | 5 | 0xFF07F0F8 | 0x12045078 |
|   | 6 | | |
| 2 | 0 | 0xFFFFFFFF | 0x87654321 |
|   | 1 | 0xFFFFFFFF | 0x12345678 |

TABLE 13-continued

Buffer Regions After Pseudo Execution Performed by Central Processor 110 based on Order of "1" to "28" Shown in Table 7

| Group ID | Offset | Mask | Vale |
|---|---|---|---|
|   | 2 | 0xFFFFFFFF | 0xAABBBCCC |
|   | 3 | 0xFFFFFFFF | 0x22221111 |
|   | 4 | 0xFFFFFFFF | 0x22222222 |
|   | 5 | | |
|   | 6 | | |
| 3 | 0 | | |
|   | 1 | 0xFFFFFFFF | 0x33331111 |
|   | 2 | 0xFFFFFFFF | 0x22555551 |
|   | 3 | 0xFFFFFFFF | 0x33333333 |
|   | 4 | 0xFFFFFFFF | 0x33334444 |
|   | 5 | 0xFFFFFFFF | 0x33335555 |
|   | 6 | | |

After performing pseudo execution on all of the original register setting commands shown in Table 7, the central processor 110 may scan the 21 buffer regions (as shown in Table 13) of the central processor 110, so as to convert the same buffer region filled with the setting value in these buffer regions into a merged register setting command ("SetRMask" or "SetR") and/or convert a plurality of buffer regions filled with the setting values and having continuous addresses in these buffer regions into the at least one merged register setting command ("SetRMask" or "SetR").

For instance, as shown in Table 13, the buffer region of the group ID 1 and offset 2 is filled with the setting value, so that the central processor 110 may convert the mask field and the value field of this same buffer region into one merged register setting command SetRMask(1, 2, 0xF3FFFFFF, 0x12345678). As shown in Table 13, the buffer region of the group ID 1 and offset 5 is filled with the setting value, so that the central processor 110 may convert the mask field and the value field of this same buffer region into one merged register setting command SetRMask(1, 5, 0xFF07F0F8, 0x12045078).

As shown in Table 13, the five buffer regions of the group ID 2 and offsets 0 to 4 are filled with the setting values, the addresses of the five buffer regions are continuous, and all of the mask fields of the five buffer regions are "0xFFFFFFFF" (that is, values are set to all of the bits of this buffer region). Therefore, the central processor 110 may convert the five buffer regions into one merged register setting command without a mask SetR(2, 0, 5, 0x87654321, 0x12345678, 0xAABBBCCC, 0x22221111, 0x22222222). As shown in Table 13, the five buffer regions of the group ID 3 and offsets 1 to 5 are filled with the setting values, the addresses of the five buffer regions are continuous, and all of the mask fields of the five buffer regions are "0xFFFFFFFF". Therefore, the central processor 110 may convert the five buffer regions into one merged register setting command SetR(3, 1, 5, 0x33331111, 0x22555551, 0x33333333, 0x33334444, 0x33335555).

Therefore, the central processor 110 may convert the 21 buffer regions shown in Table 13 into 4 merged register setting commands. That is, the central processor 110 may convert the 29 original register setting commands shown in Table 7 into 4 merged register setting commands. Therefore, since the number of the register setting commands transmitted from the central processor 110 to the co-processor 130 may be effectively reduced, the bandwidth of the bus between the central processor 110 and the co-processor 130 may be effectively used. From another perspective, since the number of these register setting commands transmitted to the co-processor 130 is reduced, the burden of the co-processor 130 to parse these register setting commands may be effectively lowered, and that the command processing speed and performance of the co-processor 130 is enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for reducing a number of commands, adapted for reducing a number of a plurality of register setting commands, the method comprising:
    generating a plurality of original register setting commands by a central processor, wherein each of the original register setting commands is adapted to set at least one bit of at least one register of a co-processor, the original register setting commands comprise a plurality of first original register setting commands, and a plurality of setting targets of the first original register setting commands have address continuity;
    merging the first original register setting commands to generate at least one merged register setting command by the central processor; and
    transmitting the at least one merged register setting command to the co-processor by the central processor,
    wherein the operation of merging the first original register setting commands comprises:
    sorting the original register setting commands according to addresses of the setting targets of the original register setting commands; and
    combining the first original register setting commands with the setting targets having addresses of a same register into the at least one merged register setting command after sorting is completed.

2. The method according to claim 1, wherein the co-processor comprises a graphic processor, and the at least one register is configured to store at least one drawing parameter.

3. A method for reducing a number of commands, adapted for reducing a number of a plurality of register setting commands, the method comprising:
    generating a plurality of original register setting commands by a central processor, wherein each of the original register setting commands is adapted to set at least one bit of at least one register of a co-processor, wherein the original register setting commands comprise a plurality of first original register setting commands, and a plurality of setting targets of the first original register setting commands have address continuity;
    merging the first original register setting commands to generate at least one merged register setting command by the central processor; and
    transmitting the at least one merged register setting command to the co-processor by the central processor
    wherein the operation of merging the first original register setting commands comprises:
    initializing at least one buffer region, wherein the at least one buffer region corresponds to the at least one register of the co-processor in a one-to-one manner;
    performing pseudo execution on the original register setting commands to correspondingly fill in the at least one buffer region with a plurality of setting values of the original register setting commands by the central processor; and
    scanning the at least one buffer region after the pseudo execution of the original register setting commands is completed, so as to convert a same buffer region filled with the setting values in the at least one buffer region into the at least one merged register setting command.

4. An electronic apparatus, comprising:
    a co-processor, comprising at least one register; and
    a central processor, coupled to the co-processor, configured to generate a plurality of original register setting commands, wherein each of the original register setting commands is adapted to set at least one bit of the at least one register of the co-processor, the original register setting commands comprise a plurality of first original register setting commands, a plurality of setting targets of the first original register setting commands have address continuity, the central processor merges the first original register setting commands to generate at least one merged register setting command, and the central processor transmits the at least one merged register setting command to the co-processor, wherein:
    the central processor sorts the original register setting commands according to addresses of the setting targets of the original register setting commands, and
    the central processor combines the first original register setting commands with the setting targets having addresses of a same register into the at least one merged register setting command after sorting is completed.

5. The electronic apparatus according to claim 4, wherein the co-processor comprises a graphic processor, and the at least one register is configured to store at least one drawing parameter.

* * * * *